D. M. MARTIN.
OIL GAUGE.
APPLICATION FILED AUG. 12, 1921.
1,434,393.
Patented Nov. 7, 1922.
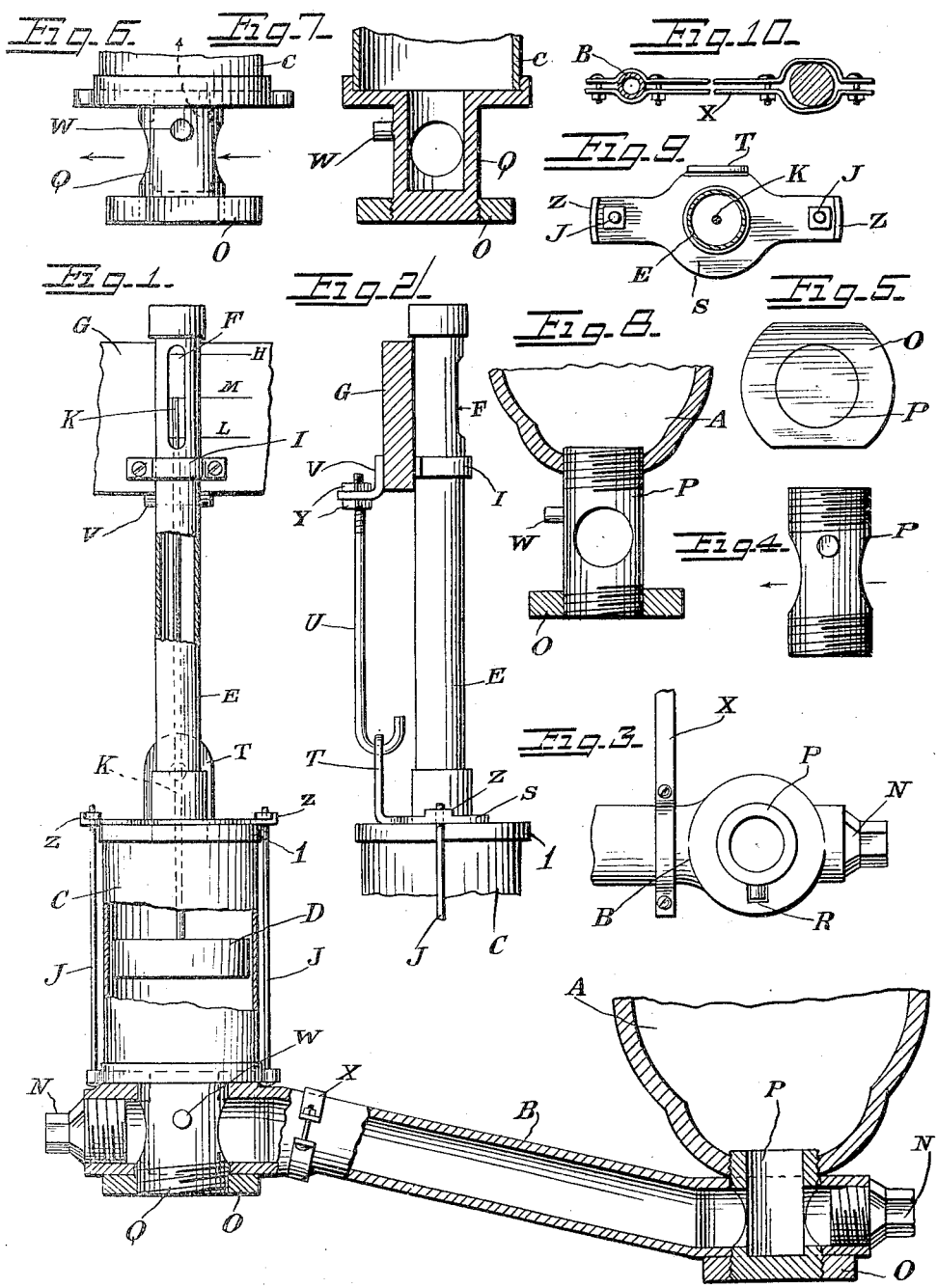

Patented Nov. 7, 1922.

1,434,393

UNITED STATES PATENT OFFICE.

DAVID M. MARTIN, OF CHATHAM, ONTARIO, CANADA.

OIL GAUGE.

Application filed August 12, 1921. Serial No. 491,859.

*To all whom it may concern:*

Be it known that I, DAVID M. MARTIN, of the city of Chatham, in the county of Kent and Province of Ontario, having invented certain new and useful Improvements in Oil Gauges, do declare that the following is a full, clear, and exact description of the same.

My invention relates to improvements in oil gauges particularly designed for cars of the Ford type, where reliance is placed on certain pet cocks to ascertain the quantity of oil in the crank case, and as a result there is more or less danger of the connecting rods being burned out, the cylinders scored, and other damages done for want of oil, when it was supposed there was sufficient oil within the crank case.

The objects of my improvements are to furnish a simple and convenient device for ascertaining the level of the oil by means of an indicator on the dash board in full view of the driver; a device that can be easily cleaned in case the flow of oil is stopped by gumming or other obstruction without detaching it from the car, and that may be readily fitted to motor vehicles in use without requiring any special change in the installation thereof.

With these and other objects in view which consists in the improved construction and novel arrangement and combination of parts.

In the accompanying drawings a simple and preferred form of the device is illustrated, it being, however, understood that no limitation is necessarily made to the precise structural details therein shown, but that changes, alterations and modifications within the scope of the invention as claimed may be resorted to when desired.

At Fig. 1 is shown a general view of the crank case of a Ford type of car with an oil gauge comprising my present invention attached thereto, Fig. 2 is a view of the adjustable cap of oil case, clamp, tube and mode of hanging the device from the dash board, Fig. 3 is a top view of enlarged portions of the leading pipe, Fig. 4 is a view of the three-way tubular stud, Fig. 5 is a view of the lower end of the tubular stud, nipple, and jam nuts, Figs. 6 and 7 are views of bottom of oil case.

Fig. 8 is a view of the three-way tubular stud attached to the bottom of the crank case, Fig. 9 is a view of the saddle clamp, and Fig. 10 is a view of the resisting brace.

Similar letters refer to similar parts in the different views:—

As shown at Fig. 1 this device consists of a leading pipe B., open at both ends and provided with corresponding stoppers N. threaded to fit the openings; it is enlarged near both ends as shown at Fig. 3 and drilled through transversely to receive the stud P. at its inlet and the nipple Q. of the bottom of the oil case C. at its outlet; a slot R. is cut in on one side of these openings to keep the stud P. and nipple Q. in their proper positions; the upper and lower surfaces of these enlarged parts, corresponding jam nuts O., and bottom of the oil case are planed to ensure non-leaking joints when the nuts are drawn up tight. A supporting stud connection P. Figs. 4 and 8 drilled from the top end to a certain depth and cross-bored to correspond with the openings in the lead pipe, has a pin W. on one side to slide into the slot R. Fig. 3 and is threaded at both ends, the upper end to connect with the crank case A. of an automobile, through the vertical opening of the pipe B. as shown at Fig. 3, and the lower end to receive a jam nut O. Fig. 5, a one-piece oil cup C. having a nipple Q. Figs. 6 and 7, is bored in like manner to the stud P. and threaded at its lower end to receive a jam nut similar to O. Fig. 5. The adjustable cap 1. is a separate piece made to fit over the body of the oil cup C. and held in place by the clamp plate S. Fig. 9 and bolts J. as shown in Figs. 1 and 2; this clamp has the ends Z. turned upward to hold the nut from turning when the bolts J. are tightened up, it is also provided with an upturned loop T. at the side, to which to hook the adjustable vibrator rod U. that is hung from a bracket V. fastened to one side of the dash board G. as shown in Fig. 2, and adjusted by means of the nuts Y. above and below the bracket V. Attached to the oil cup cap 1. and projecting through the clamp plate S. is a hollow tube E. extending upward to the front of the dash board G. to be in full view of the driver, and fastened thereto with clips I. At the upper end of said tube is inserted a glass tube F. behind which are indicating marks of the various levels as L. for low, M. for medium and H. for high.

Inside the case C. is a float D. to which is attached a rod K. projecting upward through the tube E. to the indicating tube F. and finished with an indicator.

To apply this device to an automobile, the stopper at the bottom of crank case A. is withdrawn and the stud P. hereafter called a three-way stud is screwed into its place to the proper depth. The leading pipe B. is then applied with its inner end over the stud P. so that the slot R. will slide over the pin W. as shown at Fig. 3 the jam nut O. is then applied and screwed up tight. The oil case C. is placed on the outer end, with the three way nipple inserted into the opening provided therefor, so that the pin W. will drop into the slot R. and drawn tight by a jam nut similar to O. Fig. 5. The float D. is then placed in the cup and the adjustable cap 1. is put on, so that the reading opening of the indicator will face the driver, the clamp plate 1. applied, and drawn into place by bolts J. The oil cup C. and outer end of the leading pipe B. are hung from the dash board by the adjustable vibrator rod U. of proper length fastened as formerly described. To prevent the device from being knocked off or damaged by side thrusts from below, the brace X. Fig. 10. is rigidly applied to the leading pipe B. and the opposite end to a radius rod by an elongated opening formed by said brace. In operation, when oil is poured in the crank case A. it will flow down through the three-way stud P. the leading pipe B. and the three-way nipple Q. into the oil cup C. and as it rises in the crank case it will correspondingly lift the float D. in the oil cup C. and indicator K. within the indicating tube F. and vice versa when the oil lowers in the crank case. Thus it will be seen that by means of this indicator the levels of the oil in the crank case A. are at all times shown. If from any cause the joints of the lead pipe should slacken they can readily be closed by tightening up the jam nuts O., as a further protection against leakage fibre washers are inserted between the joints. If obstructions should occur in the lead pipe or crank case from gummy oil or other causes it can be cleaned out by unscrewing the stoppers N. at both ends of the pipe and passing a wire or other suitable device through the pipe, or upward into the case as may be required.

Having described my invention and its mode of attachment, what I claim is:—

1. An oil gauge comprising attachment means connected on the bottom of an engine case and comprised of a tubular stud, the upper part of the stud being secured in the engine case, there being transverse apertures in the walls of the stud, a leading pipe fitting over said stud, a jamb nut forming a securing member for holding said leading pipe in place on the stud, oil registering means near the outer end of said leading pipe, stoppers at the ends of said leading pipe with means to removably connect said stoppers to said pipe.

2. An oil gauge comprising attachment means connected on the bottom of an engine case and comprised of a tubular stud having a pin on its side, the upper part of said stud being secured in the engine case, there being transverse apertures in the walls of the stud, a leading pipe fitting over said stud and having a slot co-operating with the pin, a jamb nut forming a securing member for holding said leading pipe in place on the stud, oil registering means near the outer end of said leading pipe, stoppers at the ends of said leading pipe with means to removably connect said stoppers to said pipe.

3. An oil gauge comprising attachment means connected on the bottom of an engine case and comprised of a tubular stud having a pin on its side, the upper part of said stud being secured in the engine case, there being transverse apertures in the walls of the stud, a leading pipe fitting over said stud having a slot co-operating with the pin, a jamb nut forming a securing member for holding said leading pipe in place on the stud, stoppers at the ends of said leading pipe with means to removably connect said stoppers to said pipe, a stud connected to the outer end of the leading pipe, an oil case provided with a cap and connected to the upper end of the stud, a clamp plate connected to the upper end of the oil case and a tube provided with a transparent section at its upper end and connected at its lower end to the cap, and an adjustable tension rod connected to the clamp plate, and to the dash board of the vehicle.

Dated at Chatham, Ont., this 30th day of July, A. D., 1921.

DAVID M. MARTIN.